UNITED STATES PATENT OFFICE.

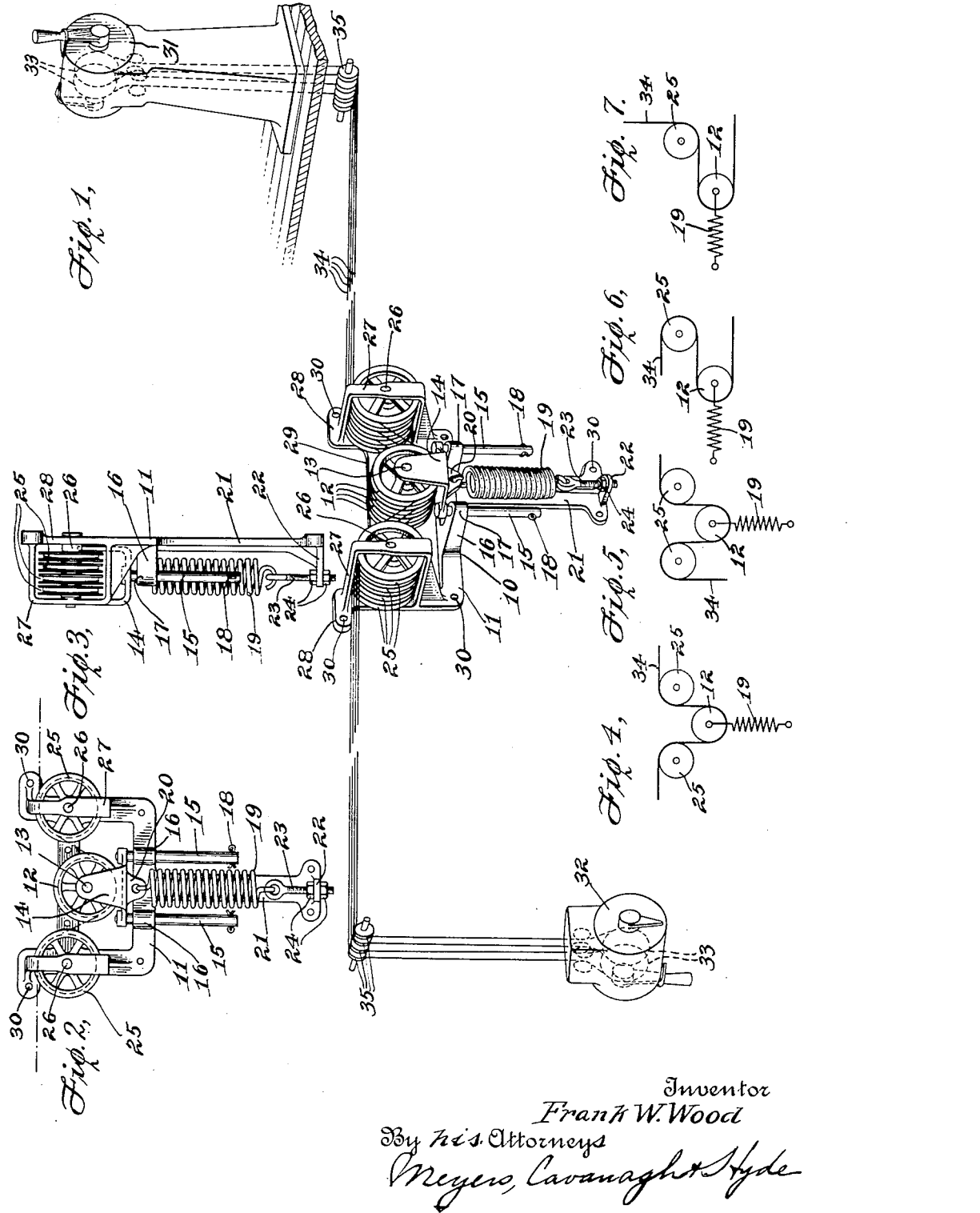

FRANK W. WOOD, OF MONTCLAIR, NEW JERSEY, ASSIGNOR TO CHAS. CORY & SON, INCORPORATED, OF NEW YORK, N. Y., A CORPORATION OF NEW YORK.

SLACK-WIRE COMPENSATOR FOR SHIPS' TELEGRAPHS.

1,387,823. Specification of Letters Patent. Patented Aug. 16, 1921.

Application filed March 9, 1920. Serial No. 364,472.

*To all whom it may concern:*

Be it known that I, FRANK W. WOOD, a citizen of the United States, and resident of Montclair, in the county of Essex and State of New Jersey, have invented certain new and useful Improvements in Slack-Wire Compensators for Ships' Telegraphs, of which the following is a specification.

My invention relates to a device for taking up slack in traveling wires.

There are various forms of apparatus which include one or more wires which have a longitudinal movement and which normally are maintained in a taut condition. For instance, certain well-known forms of signaling devices employ such wires for transmitting the signals from one point to another, this type of signaling apparatus being in common use on shipboard. Furthermore, numerous other devices commonly employed in marine work include moving wires for transmitting the motion of an element at one end of the wire to a movable element connected to the other end thereof.

While my invention is applicable to various types of such apparatus, it is particularly suitable in the form disclosed to mechanical telegraphs of the type commonly employing a transmitter and a receiver connected by wires which are shifted longitudinally to convey signals between said transmitter and receiver. One example of this type of ship's telegraph is disclosed in my Patent #1,163,191, in which the transmitter and receiver are of similar construction, each including two separate pulleys, each of said pulleys being connected with the corresponding pulley in the other unit by an endless wire belt, so that the rotation of one pulley will produce a similar rotation of the corresponding pulley in the other unit. With this arrangement, a signal is transmitted by rotating one pulley and an indicating element connected thereto, the signal being registered by the other unit through a connection between the corresponding pulley and a similar indicator. The receipt of the signal is then acknowledged by manipulating the other pulley in the receiver, which shifts the second pulley in the transmitter and the indicator connected thereto. This arrangement, however, will be understood to be purely illustrative, as obviously many other types of transmitters and receivers may be employed connected by wires for transmitting signals, in which the requirements are the same in so far as wires are concerned.

In signaling devices of this kind, and in other devices employing traveling wires, the efficiency of operation of the signal is of the greatest importance, as accurate signal transmission is vital in an emergency. To insure proper operation, it is obviously necessary that the wires should be taut, so that the least motion of the transmitter may be accurately conveyed to the receiver, preventing the uncertainty arising from locating the receiver indicator between signal stations. Furthermore, it is likewise highly necessary that the tension of the wires should not be too great, as such a condition would necessarily result in binding of the transmitter and receiver parts, and difficulty or impossibility of operation, beside increasing greatly the wearing of the parts. Moreover, such tension would greatly add to the danger of breaking the wires either through direct failure thereof or through accidental blows or shocks.

It has been found in practice, however, that it is extremely difficult to maintain the wires at an even tension. One source of difficulty is afforded by variations in temperature which change very materially the length of a relatively long wire. Furthermore, the wire and its connections have a tendency to stretch under severe tension, leaving the wire slack when the tension is removed. When the wires are employed on shipboard, a further difficulty is presented by the temporary or permanent distortion of the ship, which, while it may be relatively slight, would exert a substantial effect on wires running for a considerable distance. This difficulty is especially present in wooden ships, especially those recently constructed, which are notoriously subject to the effects of warping.

An object of my invention is to provide means which will avoid the difficulties above outlined by maintaining the wires at an even tension, assuring the accurate and ready operation of the signal or other apparatus, regardless of variations in the length of the wires from any cause.

A further difficulty in connection with wires which are maintained in a relatively taut condition is the likelihood that the wire will break if subjected to blows or lateral pressure. A further object of my invention is to provide means which, while maintaining the wires in taut condition, will permit them to yield to blows and pressure, thus avoiding the danger of rupture thereby.

It is often necessary to run wires of this type, especially on shipboard, along a very devious path, owing to the exigencies of the structure on which said wires are carried. This condition adds to the difficulties presented in maintaining the wires properly taut, as the pulleys or other carrying members about which the wire is passed when changing direction necessarily offer a certain amount of resistance to the travel thereof, both because of friction and because of the necessary distortion of the wire in passing over such pulleys. Consequently, certain portions of the wire may be properly taut, while other portions are relatively slack, the resistance at the pulleys being sufficient to prevent the taut portions from taking up such slack or a part thereof.

For this reason, in certain types of installation, it is impractical to obtain the proper taut condition of the wires by devices located adjacent the ends thereof. An object of my invention in the embodiment disclosed herein is to provide means for taking up such slack at various points throughout the length of the wire and which is especially adapted for use at points where the wire changes its direction, thus compensating for any resistance at such points, and assuring proper and easy travel of the wire.

In the specific form illustrated, I also disclose an arrangement adapted to take up the slack in a long, straight stretch of wire and likewise adapted to be employed where the wire changes direction in various ways.

A further object is to produce a device of this type which is simple in construction and strong, being adapted to withstand the rigors of marine use. I also have provided a device in which the tension of the wire may be readily regulated, thus permitting adjustment and compensation for changes in conditions or apparatus.

Another object is to provide a device of this character which is compact and is adapted to be located in various positions and within a small space, these qualities being especially necessary when such device is employed on shipboard, where space is limited and the wires are ordinarily run in out-of-the-way places.

Wires of the type above indicated generally pass relatively close to fixed portions of the structure on which they are mounted, and often are confined to limited passages. A further object of my invention is to provide a device which will compensate for variations in the length of the wire, and which may engage the wire at any desired point, exercising its compensating effect without shifting the wires from their normal path, except for the portion thereof engaged by the device.

Other objects and advantages of my invention will be apparent from the following description, taken in connection with the accompanying drawings, in which:

Figure 1 is a perspective view of a preferred form of my invention, showing somewhat diagrammatically its employment in a signaling system, Fig. 2 is a front elevation, Fig. 3 is a side elevation, and Figs. 4, 5, 6 and 7 are diagrammatic illustrations of various methods of employing my device.

In the preferred form, my device includes a frame generally indicated at 10, which may be of any suitable form. The frame preferably includes a suitable base member, such as cross bar 11, adapted to be mounted in fixed position. A suitable number of pulleys 12 are rotatably mounted on pin 13, the ends of which engage a suitable yoke 14 which is slidably mounted on frame 10 so that said yoke 14 and pulleys 12 are free to move in either direction along a fixed path. One arrangement of parts suitable to accomplish this object includes one or more guide rods 15 mounted on yoke 14 and engaging guide arms 16 carried by cross bar 11, as by providing bearings 17 on the guide arms 16 through which guide rods 15 are adapted to slide.

In order to prevent yoke 14 and the parts connected thereto from being accidentally separated from the frame, cotter pins 18 may be passed through the lower ends of guide rods 15, this arrangement permitting the removal of said yoke and parts when desired. A spring 19 is connected to yoke 14, as by providing a lug 20 on said yoke, said lug being engaged by one end of spring 19. The other end of said spring is connected to the frame, as by providing a depending arm 21 having an outstanding lug 22 to which spring 19 is connected.

I prefer to employ means for adjusting the tension of said spring, one suitable arrangement being the provision of a threaded adjusting rod 23 connected to the lower end of spring 19 and passing through lug 22, suitable nuts 24 being provided for adjusting the tension of spring 19 by varying the position of rod 23, and for locking said rod in adjusted position.

When my device is intended to be used under certain conditions hereinafter indicated, I may also employ an auxiliary set or sets of pulleys 25 located at one or both sides of pulleys 12 and in alinement therewith, said auxiliary pulleys being preferably mounted in fixed position. Various arrangements for this purpose may obviously be made. In the specific form shown, I have rotatably mounted said pulleys 25 on a pin 26 carried by the frame, as by employing a yoke 27 connected to a wing extension 28 which may be carried by cross bar 11. However, to obtain the requisite strength and lightness, wing extensions 28, if two are employed, may be connected by cross brace 29.

Suitable means for mounting or facilitating the mounting of frame 10 in fixed position, such as screw holes 30, may be located at various points on the frame.

In the specific application of my invention which is illustrated in Fig. 1, I have shown somewhat diagrammatically a transmitter 31 and receiver 32 each provided with a pair of pulleys 33, each of the transmitter pulleys being connected with a receiver pulley by means of an endless wire 34. This construction is the same as that shown in my above-mentioned patent.

I have also disclosed my invention as applied to the parallel runs of wires 34 intermediate the ends of a straight stretch thereof between guide pulleys 35. With this arrangement, each run of a wire 34 is passed over a pulley 25, under a pulley 12, and then over the opposite corresponding pulley 25, spring 19 tending to pull each pulley 12 downwardly and exert a tension upon wires 34. The normal length of wires 34 is such that with this arrangement, said wires will tend to force pulleys 12 upwardly against the tension of spring 19, thus maintaining said wires in a taut condition, the tension thereon being determined by the strength of spring 19, which can be regulated by manipulating nuts 24. It will be evident that any increase in length of wire 34 will be compensated by a corresponding descent of pulleys 12 caused by spring 19, while a shortening of said wires will produce a corresponding rise in said pulleys 12, thus providing automatic adjustment to various conditions of said wires. Furthermore, if said wires are subjected to a blow or shock, the resulting upward movement of pulleys 12 will permit the wires to yield, preventing rupture.

It will be readily understood that while the device shown in Fig. 1 may be employed on a straight stretch of wires, as is indicated diagrammatically in Fig. 4, such device may also be used where the wires change direction at the point of application of the device. One arrangement suitable for this purpose is shown in Fig. 5; and obviously, the device may also be located with the pulleys 12 at the opposite side of the right-hand run of such wires shown in said figure, according to the requirements of the structure upon which the device is mounted.

Fig. 6 indicates diagrammatically another arrangement where the wires proceed in the same direction after passing through the device, but on a slightly different plane. While the construction shown in Fig. 1 may be employed for this purpose, it will be obvious that one set of pulleys 25 and their supporting structure may be dispensed with under such conditions. Such a construction, including pulleys 12 and one set of pulleys 25, may also be employed where the wires turn at right angles, as is indicated in Fig. 7. Furthermore, under conditions where wires change direction through a substantial angle at the point of engagement with said device, both sets of pulleys 25 may be dispensed with, the pulleys 12 being adequate to compensate for variations in the length of said wires. This arrangement, however, will change slightly the path of said wires, except where the wires return in a parallel path after passing around pulleys 12, the construction including a single set of pulleys being especially suitable for such an arrangement.

It will be apparent that with the arrangement shown in Figs. 4 to 8, the compensation for variations in wire length is automatically effected without changing the path of said wires.

It will be evident that I have provided an extremely simple and strong construction, positive and automatic in action and capable of ready and permanent adjustment. I have also arranged and constructed the parts so that they may be manufactured easily and cheaply, and assembled or replaced with the greatest facility. My device is, furthermore, compact and capable of use in a great variety of positions.

It will further be apparent that numerous changes in the construction disclosed may be made within the scope of this invention. While I have shown pulleys 12 as mounted on a single yoke 14 in combination with a similar number of pulleys 25, it will be apparent that my invention is not limited to a construction in which all of the pulleys 12 are interdependent and move in unison.

Furthermore, while I have used the term "wire" throughout the specification, it will be apparent that this is not intended to be restrictive, as a great many other types of flexible connectors, ropes, cord and bands are well known and may be employed instead of wires 34.

While I have described the preferred form of my invention and have indicated certain variations therein, it will be apparent that many other changes may be made within the scope of my invention as set forth in this specification.

I claim:

1. For use in a mechanical ship telegraph comprising a transmitting and a receiving station, and relatively long stretches of transmission cords connecting the stations, a unitary tensioning apparatus adapted to be located at a suitable point between or remote from the stations and comprising a guide pulley engaging one of the cords, a tensioning pulley engaging the cord and movable to take up slack, and resilient means applied to said tensioning pulley to take up the cord slack.

2. A device for taking up and tensioning wires and the like, comprising a frame including an arm, a helical spring connected at one end to said arm adjacent one end thereof, and a pulley movably mounted on said frame adjacent the other end of the arm and connected to the other end of said spring, the construction being such that the spring will yieldingly resist movements of the pulley caused by an element traveling thereover.

3. A device for taking up and tensioning wires and the like, comprising a frame including an arm, a helical spring connected at one end to said arm adjacent one end thereof, a pulley movably mounted on said frame adjacent the other end of the arm and connected to the other end of said spring, and means for adjusting the tension of said spring, the construction being such that the spring will yieldingly resist movements of the pulley caused by an element traveling thereover.

4. A device for taking up and tensioning wires and the like, comprising a frame including an arm, a helical spring connected at one end to said arm adjacent one end thereof, a support, a pulley rotatably mounted thereon, interengaging guide means for slidably connecting said support and frame to permit reciprocating movements of said pulley, the other end of the spring being connected to said support, the construction being such that said spring is adapted to yieldingly resist movements of the support caused by an element traveling over the pulley.

5. A device for taking up and tensioning wires and the like, comprising a frame including an arm, a helical spring connected at one end to said arm adjacent an end thereof, a support connected to the other end of the spring, a pulley rotatably mounted on the support, guide members carried by the frame adjacent the other end of the arm, and guide members carried by the support engaging the frame guide members to permit reciprocating movements of said pulley and support in line with the axis of said spring.

6. A unitary appliance applicable in various positions to stretches of wire, transmission cables and the like, including a frame, a pulley rotatably mounted thereon in fixed position, a spring connected at one end to said frame, a pulley connected to the other end of the spring and normally adjacent and in alinement with the fixed pulley, and means for adjusting the tension of the spring.

7. A unitary appliance applicable in various positions to stretches of wire, transmission cables and the like, including a frame, a pulley rotatably mounted thereon in fixed position, a spring mounted on the frame, a support connected to the spring, a pulley rotatably mounted on said support in alinement with the fixed pulley, and means for guiding the spring connected pulley in a fixed path, the construction being such that said spring connected pulley is free to move in alinement with the fixed pulley against the tension of the spring to regulate the tension of an element passing over both of said pulleys.

8. A device for taking up and tensioning wires and the like, including a frame, two spaced pulleys rotatably mounted in alinement on said frame, a spring connected at one end to the frame, and a pulley connected to the other end of the spring, normally revolving in the same plane as the fixed pulleys and movable transversely in said plane between the fixed pulleys against the tension of said spring.

9. A device for taking up and tensioning wires and the like, including a frame, two spaced pulleys rotatably mounted in alinement on said frame, a helical spring connected at one end to the frame, a support connected to the other end of the spring, a pulley rotatably mounted on the support, and guide means connecting the frame and support for maintaining the pulley thereon in alinement with said fixed pulleys while permitting movement of said support and the pulley carried thereby in a predetermined path between the fixed pulleys, the construction being such that said movable pulley will maintain a fixed tension through the action of the spring upon a traveling element passing over said fixed pulleys and movable pulley.

10. A unitary tension device applicable in different intermediate positions to stretches of wires, cables or belts of transmission apparatus, comprising a frame, a pulley mounted revolubly on a fixed axis on the frame and adapted to have guiding engagement with a stretch of the transmission wire or like member, a second pulley movably mounted on the frame in substantially the same plane as the fixed pulley and adapted to engage the wire, and resilient means acting on the second pulley to deflect the wire to take up slack and apply tension to the wire.

11. A unitary tension device applicable in different positions to stretches of wires, cables or belts of transmission apparatus, comprising a main frame, a pulley revolubly mounted thereon on a fixed axis, a movable frame, guides connecting the movable frame with the main frame, a spring acting between the main frame and the movable frame, and a tension pulley revolubly mounted in the movable frame and running in substantially the same plane as the fixed pulley, the two pulleys being adapted to engage a stretch of the transmission wire or like member and variably bend it to take up slack and apply tension.

12. A self contained tensioning appliance for stretches of wires, cables or the like, comprising a main frame, two pulleys mounted on fixed axes thereon in substantially the same plane and considerably separated from each other, a reciprocating frame, guides connecting the reciprocating frame with the main frame, a tension pulley revolubly mounted in the reciprocating frame in substantially the same plane as the fixed pulleys and located operatively between them, and a spring acting between the main frame and the reciprocating frame to urge the tension pulley out of line with the fixed pulleys, the pulleys being adapted to engage a stretch of the transmission wire or the like and maintain a bend in the wire to take up slack and apply tension.

Signed at New York city, in the county of New York and State of New York, March, A. D. 1920.

FRANK W. WOOD.

Witnesses:
 RICHARD L. CASSON,
 GEO. W. VERMILYE.